Oct. 6, 1942.  S. KARASICK  2,297,895
COILED-COIL PRODUCT AND METHOD OF AND APPARATUS FOR MAKING THE SAME
Filed Feb. 12, 1937  8 Sheets-Sheet 1
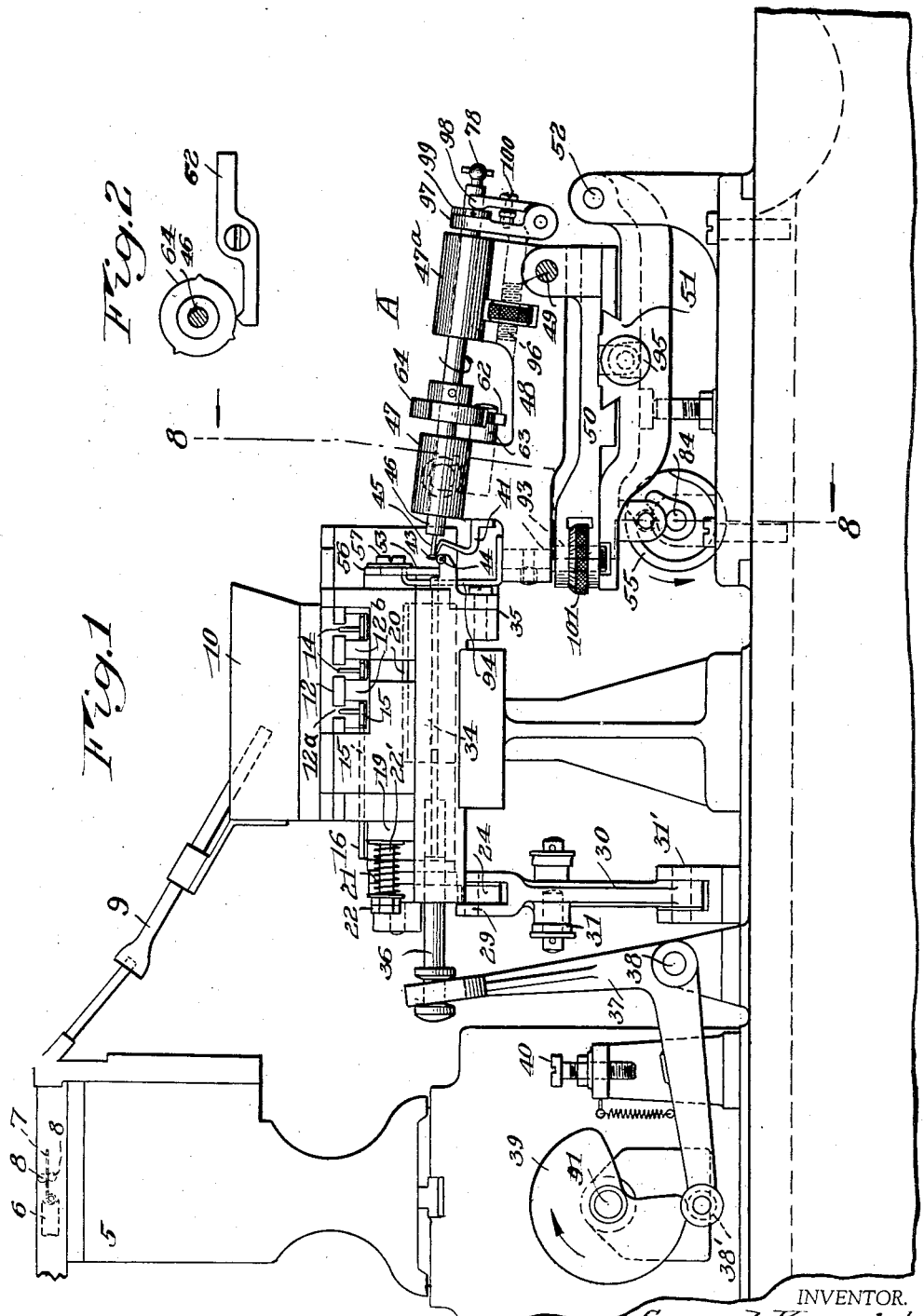
INVENTOR.
Samuel Karasick
BY D. Clyde Jones
his ATTORNEY.

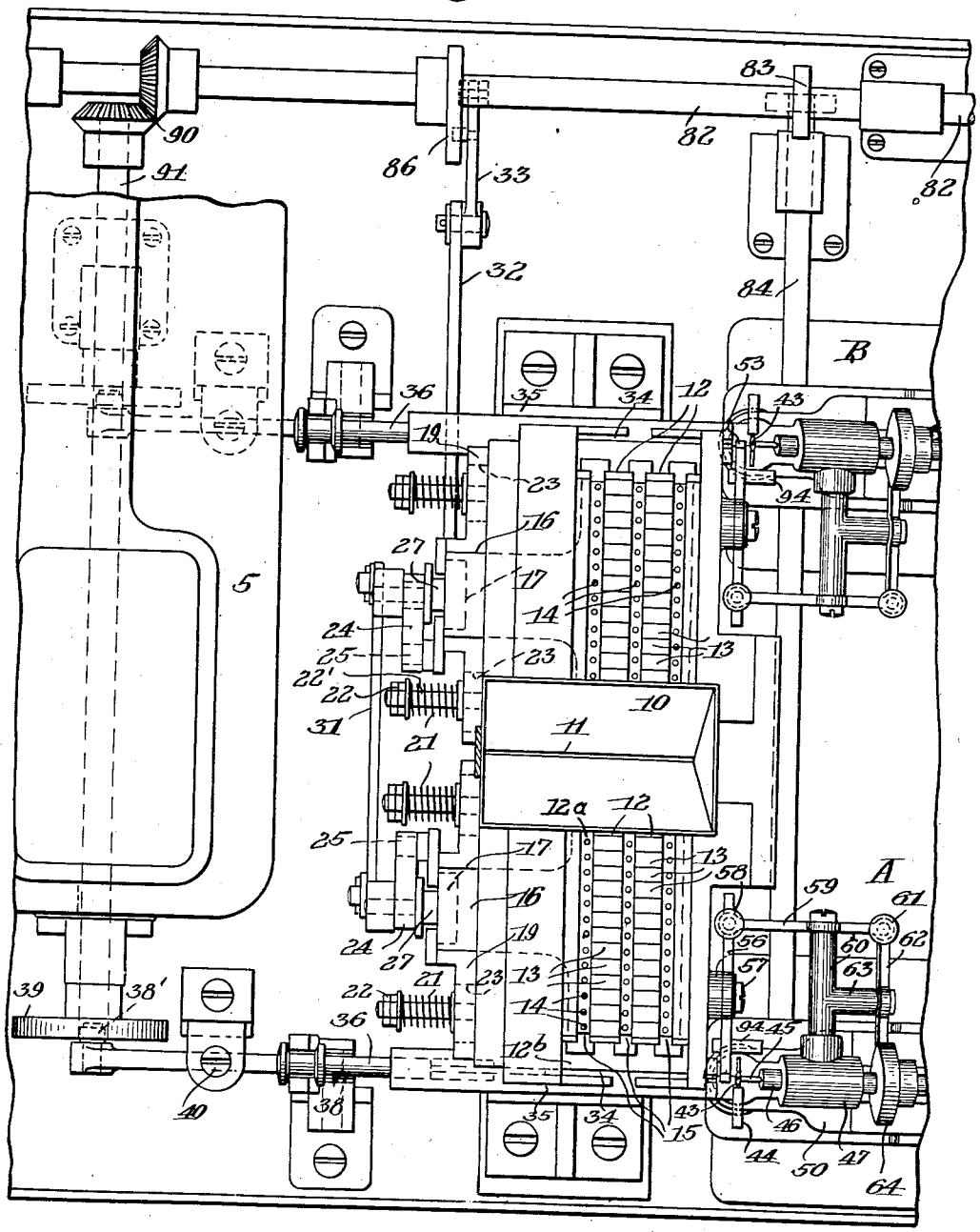

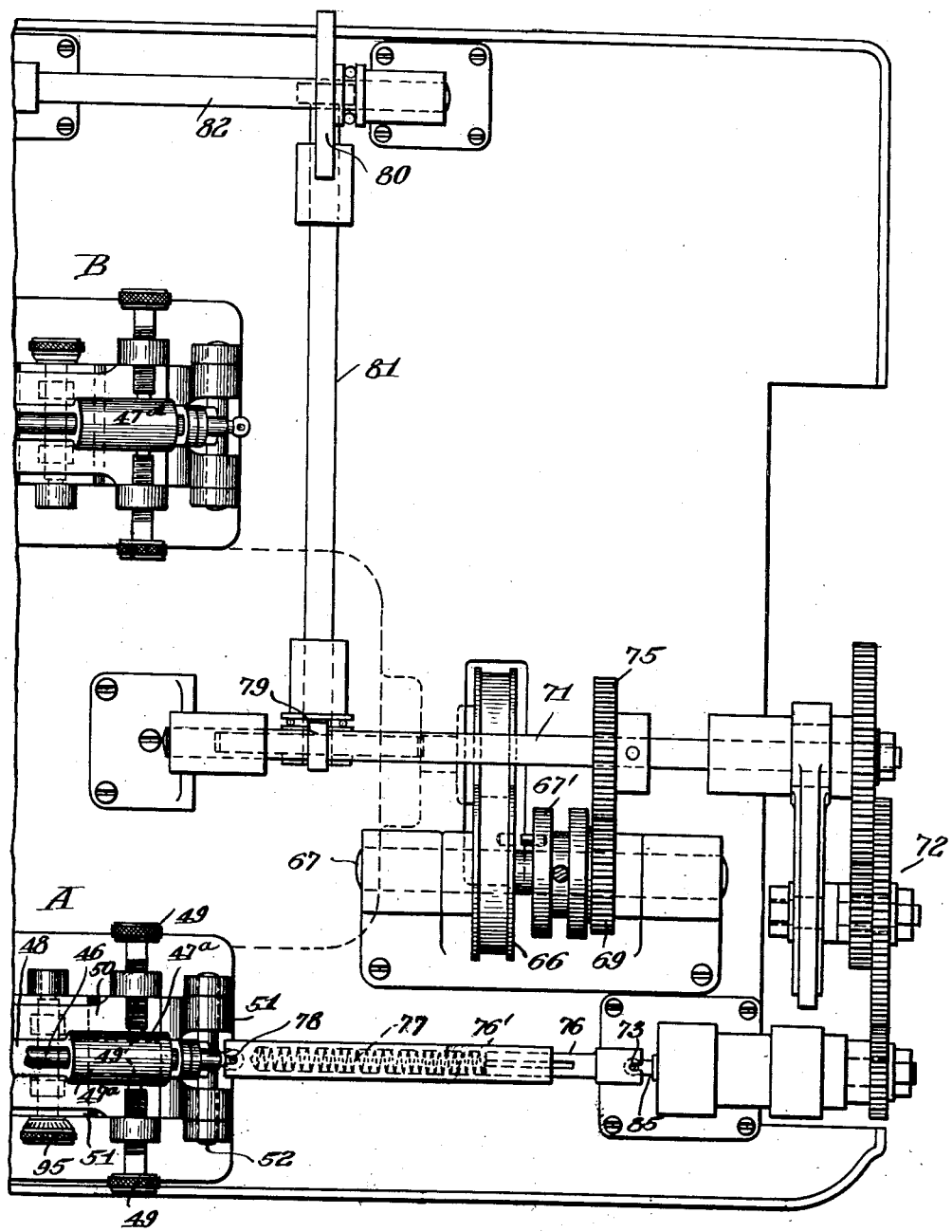

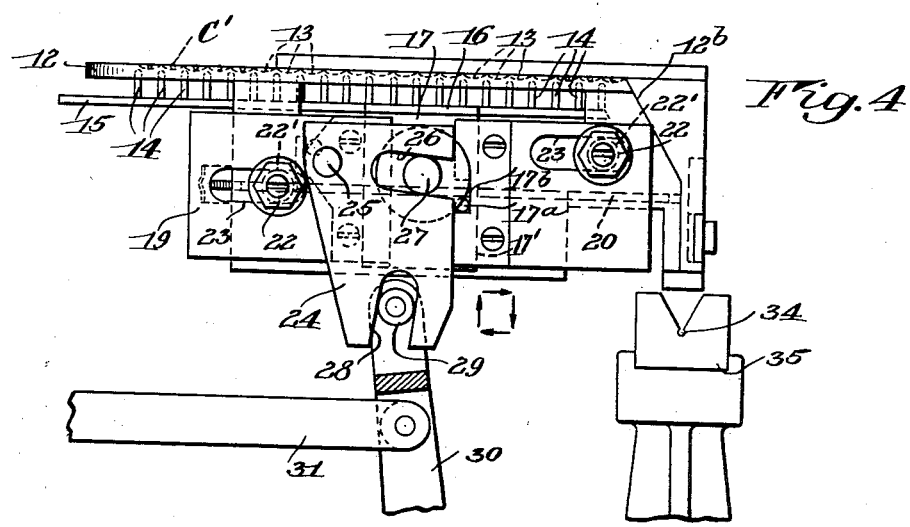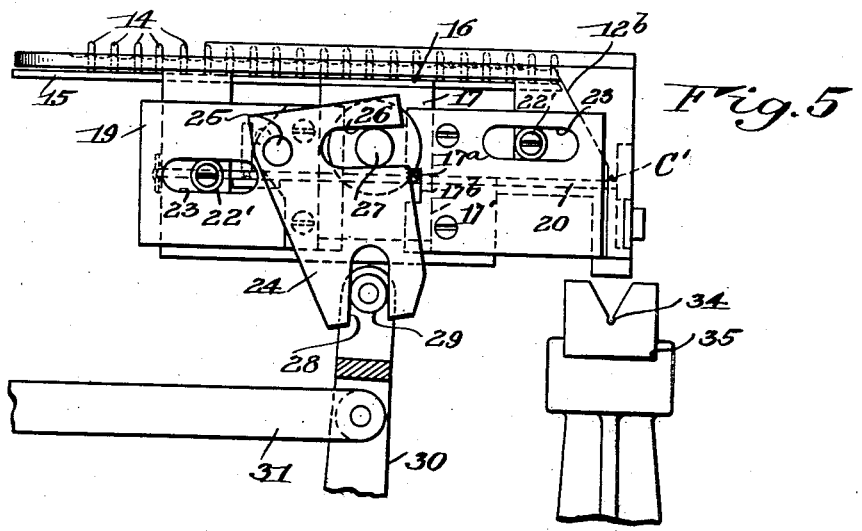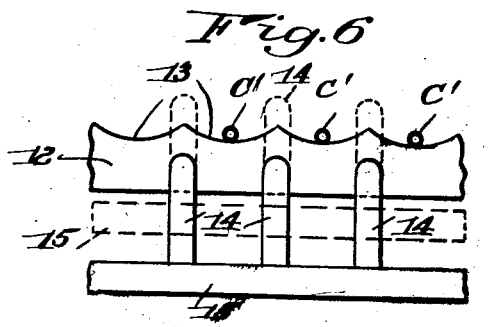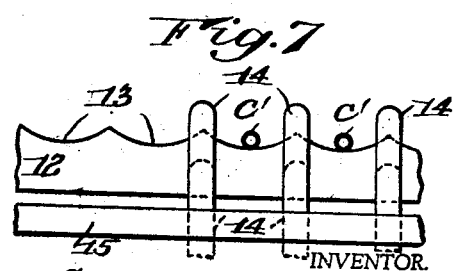

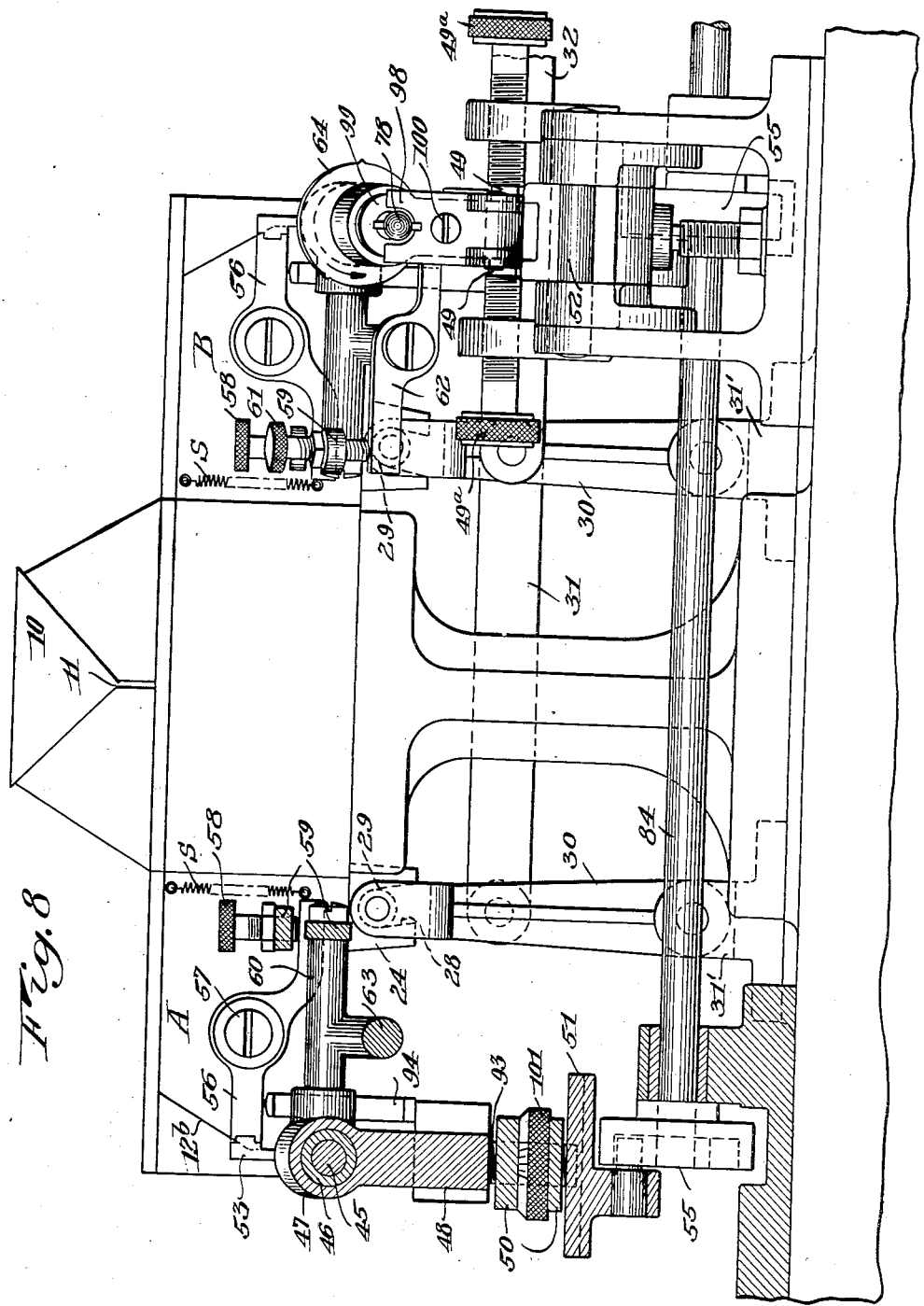

Oct. 6, 1942.  S. KARASICK  2,297,895
COILED-COIL PRODUCT AND METHOD OF AND APPARATUS FOR MAKING THE SAME
Filed Feb. 12, 1937  8 Sheets-Sheet 6
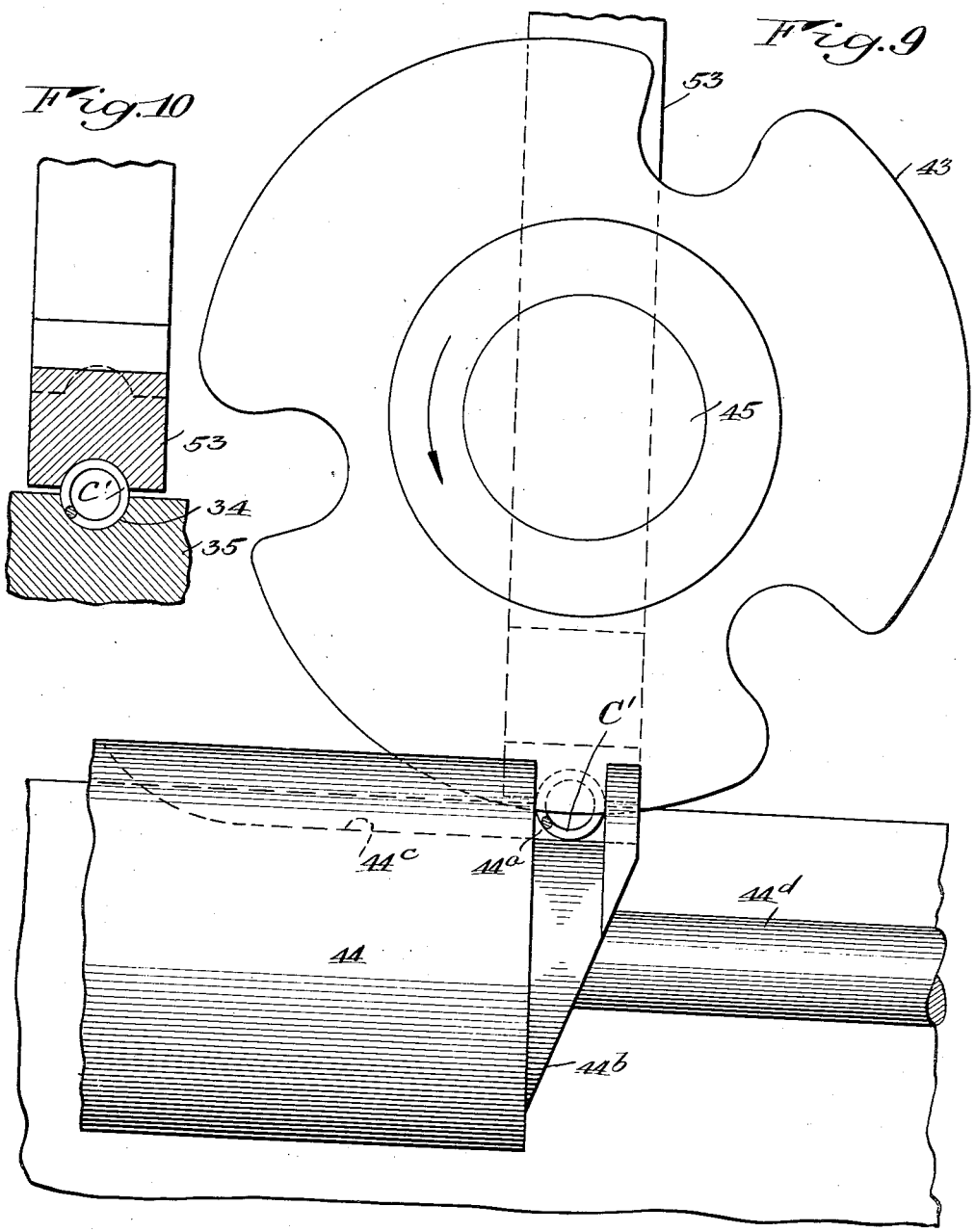
INVENTOR.
Samuel Karasick
BY D. Clyde Jones
his ATTORNEY.

Oct. 6, 1942.   S. KARASICK   2,297,895
COILED-COIL PRODUCT AND METHOD OF AND APPARATUS FOR MAKING THE SAME
Filed Feb. 12, 1937   8 Sheets-Sheet 7
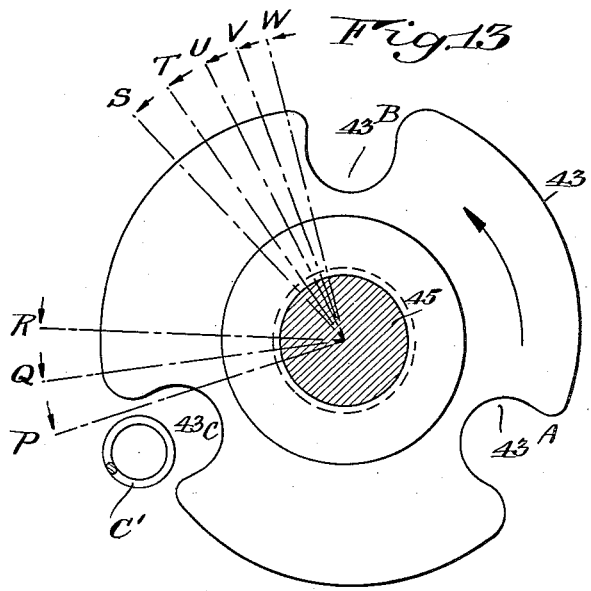
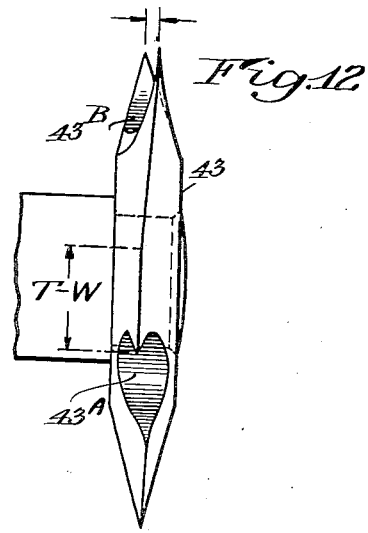
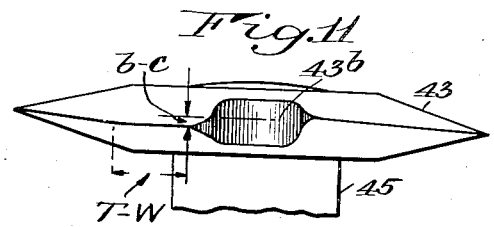
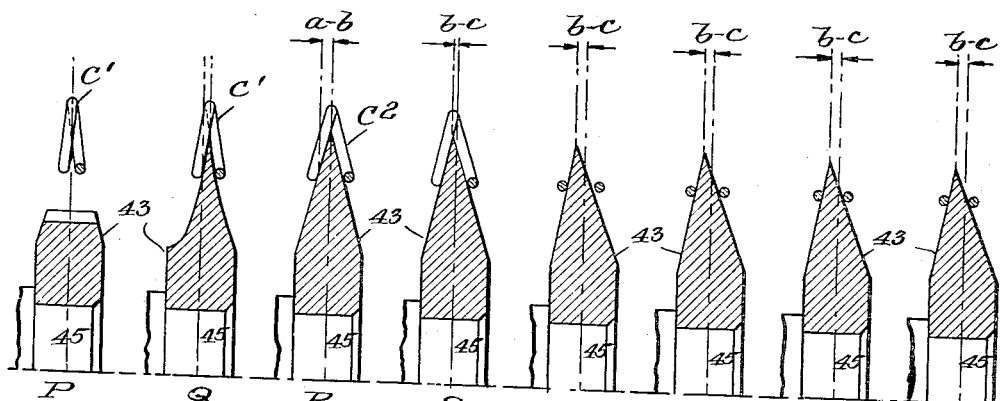
Fig.14  Fig.15  Fig.16  Fig.17  Fig.18  Fig.19  Fig.20  Fig.21
INVENTOR.
Samuel Karasick
BY D. Clyde Jones
his ATTORNEY.

Oct. 6, 1942.    S. KARASICK    2,297,895
COILED-COIL PRODUCT AND METHOD OF AND APPARATUS FOR MAKING THE SAME
Filed Feb. 12, 1937    8 Sheets-Sheet 8
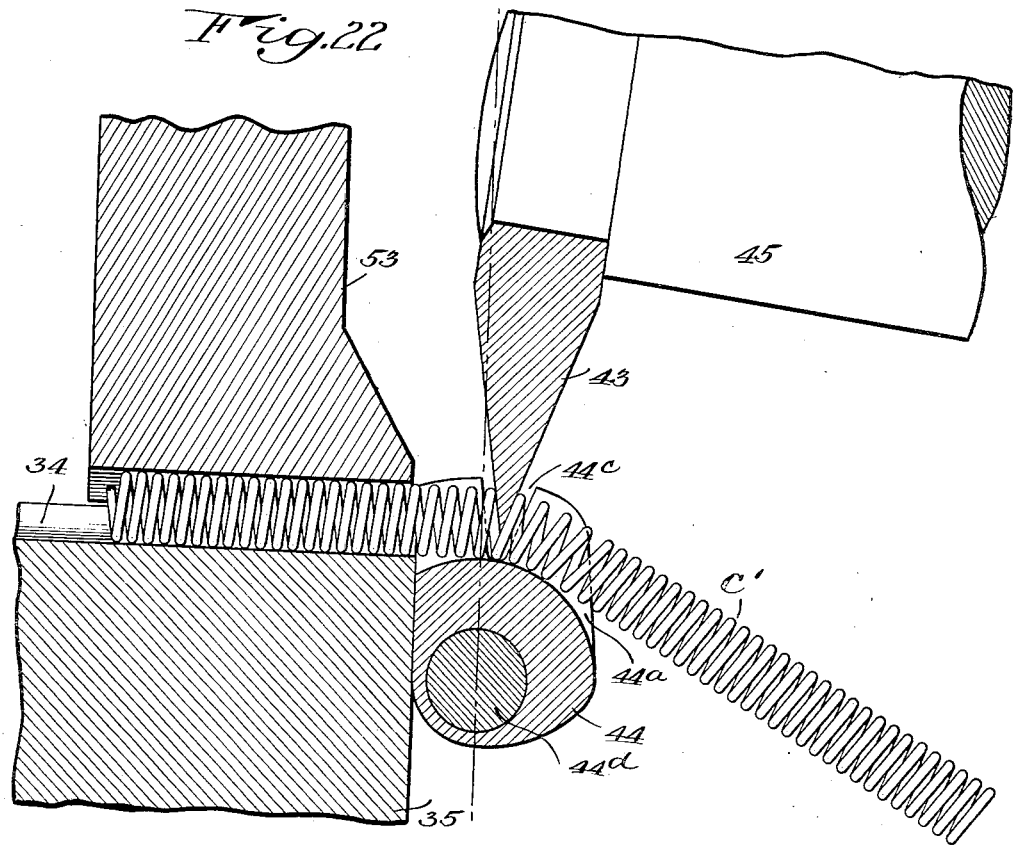
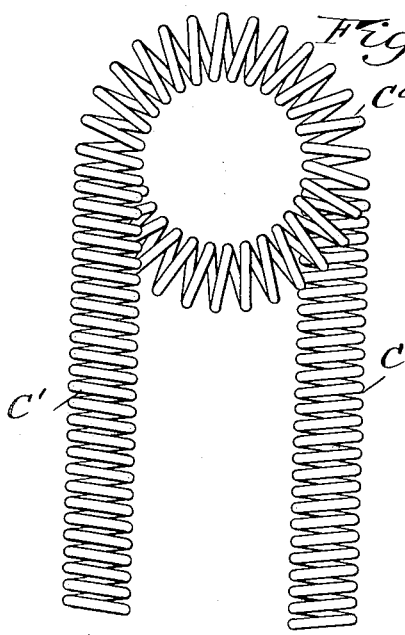
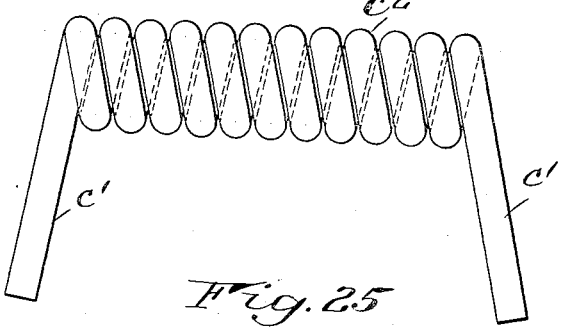
INVENTOR.
Samuel Karasick
BY D. Clyde Jones
his ATTORNEY.

Patented Oct. 6, 1942

2,297,895

UNITED STATES PATENT OFFICE 2,297,895

COILED-COIL PRODUCT AND METHOD OF AND APPARATUS FOR MAKING THE SAME

Samuel Karasick, Mount Vernon, N. Y.

Application February 12, 1937, Serial No. 125,476

64 Claims. (Cl. 153—64)

This invention relates to a coiled-coil product as well as to a method of and to apparatus for generating a helical primary coil of wire and for forming said coil into a secondary helical coil to constitute a coiled-coil such as is used as a filament in what is known as the coiled-coil type of incandescent lamp.

The coiled-coil type of filament made from a given length of wire, when used in an incandescent lamp, has been found to produce light more efficiently than does the ordinary single coil type of filament made from an equal length of wire, for the same reasons that the single coil is more efficient than the now obsolete uncoiled filament type of lamp, since the mutual heating of the adjacent coil turns of wire, results in a higher temperature for a given current, or conversely a lesser current can be used to secure the same temperature. Furthermore, such a coiled-coil filament increases the concentration of the light source and in addition requires fewer supporting wires than the single coil filament type thereby simplifying lamp construction.

This coiled-coil type of filament has heretofore been produced by winding a primary helically wound coil of wire, spirally around a mandrel, which is subsequently dissolved, the mandrel being formed of a material soluble in acids which do not appreciably attack the refractory filament wire which is usually made of tungsten. This mandrel method, however, is slow and costly and fails to produce filaments of a high degree of uniformity or accuracy. In the production of single coil filaments, the use of a mandrel has been largely superseded, by the so-called mandrelless type of coil winder as described in U. S. Pat. No. 1,670,499, issued May 22, 1928, which primary coil winder drives the tungsten wire into a cavity in a diamond die causing it to issue therefrom in a helical coil. A coil winder of this type is capable of producing single coiled filaments at lower cost and much more rapidly than is possible by the use of mandrels.

It is well-known that unless the process of forming the primary coil is carefully controlled, non-uniformity of pitch will result in so called "spotty" filaments. These pitch variations are in part unavoidable due to variations in the hardness of the tungsten wire, and departures from truly circular cross sections thereof.

The main feature of the invention relates to a method of making coiled-coils in which method a secondary helix or coil is formed from a primary coil by progressively bending the turns of the primary coil toward the principal axis thereof.

Another feature of the invention relates to the provision of means for progressively bending a predetermined number of the turns of a primary coil toward the main axis thereof, so as to form a secondary coil from the intermediate portion of said primary coil.

An additional feature of the invention relates to the provision of means for forming wire into a primary helical coil and then forming this primary coil into a secondary helix or coiled-coil, without the use of a mandrel.

Still another feature of the invention relates to means for forming a secondary coil from a primary coil with straight portions of the primary coil at each end of the secondary coil.

A further feature of the invention relates to means in a coil forming machine to correct any inequalities in pitch of the primary helix or coil in the process of forming the secondary helix or coil therefrom.

Another feature of the invention relates to a coiled-coil winding machine of the mandrelless type adapted by suitable adjustments or substitution of certain small and easily replaceable parts to produce coiled-coils of a wide variety of primary and secondary coil diameters and pitches; to produce right or left hand secondary coils from right or left hand primary coils; and to provide variable lengths of uncoiled primary coil at the ends of a secondary coil. This flexibility of adjustment, together with the high outputs obtainable from the machine, makes it possible to keep a large variety of coiled-coil lamps in production with a small number of these machines, since any machine may be utilized for any type of coiled-coil, yet this involves no sacrifice of accuracy in producing any given type of such coiled-coil lamp filament.

Other features and advantages of this invention will be understood from the following description and appended claims when taken with the drawings in which Fig. 1 is a front elevation of a coiled-coil forming machine of the present invention; Fig. 2 is an enlarged detailed view of a cam and lever which time the raising and lowering of the primary coil clamp; Figs. 3a and 3b when arranged in the order named illustrate a plan view of the machine; Fig. 4 is a side view of the actuating means of the primary coil feeding mechanism in one of its operative positions; Fig. 5 is a detailed side view of the primary coil feeding mechanism in another of its operative positions; Figs. 6 and 7 are enlarged detail views of the platform and traveling pins of the feeding mechanism showing the pins respectively in their retrograde and advancing movements; Fig. 8 is a partial section through the impeller mechanism of the unit A taken on the line 8—8 of Fig. 1, the impeller mechanism of the secondary coil forming unit B being shown complete; Fig. 9 is a greatly enlarged view of the impeller and the support for the primary coil while it is being operated on by the impeller and also showing a portion of the support for the secondary coil while it is being formed; Fig. 10 is a detailed view partially in section illustrating how the primary coil is clamped during a portion of the operation; Figs. 11 and 12 are greatly enlarged edge views of the impeller in different positions; Fig. 13 is a front view of the impeller with the primary coil located in one of the notches therein; Figs. 14 to 21 inclusive are radial sections taken respectively on the lines P, Q, R, S, T, U, V of Fig. 13; Fig. 22 is a greatly enlarged view partially in section indicating how an intermediate portion of the primary coil is clamped and also showing the relation of the impeller to the primary coil while the turns thereof are being bent into a secondary coil; Figs. 23 and 24 are a greatly enlarged end view and a front view respectively of the completed coiled coil; and Fig. 25 is likewise a front view of a finished coiled coil on a somewhat reduced scale although greatly enlarged over the actual finished product, but specifically showing the individual turns of the primary coil as well as the turns of the secondary coil.

In the drawings the numeral 5 generally designates a primary coil generating unit of the mandrelless type including a diamond die 6 mounted in a fixed support and having a concavity therein into which one end of a given length of filament wire 7 is fed by feed rolls 8, 8. The wire when thus forced into the die emerges as a primary coil C'. Such a primary coil winding machine is well known in the art and may be of the type more fully disclosed in the mentioned Patent #1,670,499. Since such primary coil winding machines have a relatively large output of primary coils it is desirable to provide two secondary coil forming units A and B in the present machine so that the primary coils may be formed into secondary coils as soon as they are produced. The need for two secondary coil forming units to receive the output of primary coils will be appreciated when it is understood that each turn of the secondary coil will involve forming operations on a considerable number of turns of the primary coil since each turn of the primary coil must be separately bent or operated upon in a predetermined manner to produce the secondary coil. In the present arrangement it is, therefore, desirable to provide such duplicate secondary coil forming units and to adjust their rates of operation so that each produces one-half as many secondary coils or coiled-coil filaments as primary coils which are produced by the primary unit in a given interval of time.

The primary coils emerging from the primary coil forming unit 5 are discharged through the chute 9 into a hopper 10. Chute 9 has been omitted in Fig. 3A for the sake of clearness in the drawing. This hopper has tapered sides which terminate at a slit 11 in the bottom of the hopper, the width of this slit being such as to permit the primary coils to drop therethrough one at a time with their long axes extending always in the same direction. The slit 11 is positioned above the plane of the primary coil feeding mechanisms of units A and B which mechanisms alternately reciprocate into positions under the slit 11 so that the hopper first discharges a primary coil on one feeding mechanism and then on the other. Each feeding mechanism comprises a body member having a fixed platform 12 provided with broad transverse grooves or corrugations 13 therein extending parallel to the slot 11 each corrugation being adapted to receive a primary coil. Each platform 12 has three longitudinal slots 12a therein (Figs. 1 and 3A) through which a series of pins 14 project from bars 15 movable simultaneously with respect to the platform 12. The bars 15 are secured to a laterally extending bar 16 which is provided at its outer end with a vertically movable gib 17. This gib is adapted to move up and down in guide way 17' in a horizontally shiftable block 19 which is provided with a cutoff blade 20 to hold and then to release a primary coil after it drops down the inclined end 12b of the platform. The block 19 is held against the body member by coil springs 21 engaging respectively the side of the block and nuts 22 threaded on the free ends of studs 22'. These studs pass thru the coil springs and project from the body member thru slots 23 in the block thereby insuring a smooth regular motion of the feeding mechanism. A cam plate 24 which is pivoted at 25 on the block 19 is provided with a notch 26 to receive a pin 27 secured on the gib 17. In the lower end of the cam 24 there is also provided a notch 28 to cooperate with a pin 29 mounted on the free end of a rocking arm 30 which is pivoted at 31' in a portion of the bed plate of the machine. The arm 30 is rocked by links 31, and 32 which are reciprocated by link 33 (Fig. 3A). It will be appreciated that as the arm 30 is rocked toward the left the pin 29 thereon moves the cam 24 in a clockwise direction and cam slot 26 moves the pin 27 carried on one of the gibs, downward. This lowers the pins 14 below the plane of the platform 12. It will be noted that gib 17 carries a projecting pin 17a which is adapted to travel back and forth in the notch 17b, formed in the guide ways 17'. The vertical length of the notch 17b is equal to the amount of vertical travel of the bars 15. Thus when the pins 14 have been lowered below the plane of the platform 12, pin 17a will engage the lower end of notch 17b (Fig. 4) and further pivoting of the cam 24 in a clockwise direction will be prevented. The continued movement of the cam to the left moves the block 19 as well as the bars 15 and the pins 14 carried thereon toward the left so that the pins are moved in this direction a distance corresponding to the space between adjacent corrugations 13. A reverse movement of the rocking arm moves cam 24 in a counterclockwise direction. At this time cam 24 first elevates the pins 14 until pin 17a engages the upper end of the notch 17b and then advances them toward the right to move the series of primary coils across the corrugations so that the last coil of the series drops down the inclined end 12b of the platform. Thus the pins 14 are so operated that their top portions travel in a path defining a parallelogram whereby in their cycle of movements they rise above the level of the platform and then move with respect to the platform to advance a series of primary coils one groove at a time along the platform. Thereafter the ends of the pins drop down below the level of the platform, move backward and then upward in back of succeeding primary coils on the platform. This feeding mechanism thus constitutes means for advancing a series of primary coils along the platform a step at a time. With each cycle of movements of the pins as described, a primary coil drops down the inclined end 12b of the platform to the cutoff blade 20. When this blade is retracted the coil drops into a groove 34 of its related unit in a fixed table 35.

A member 44 (Figs. 1, 9 and 22) mounted in the right hand end of the table 35, supports a part of the primary coil C' while it is being formed into a secondary coil, and also supports the finished portion of the secondary coil. This member is made by cutting the groove 44a near one end of the generally cylindrical support member 44 and then cutting away a portion of the member to provide an inclined or beveled surface 44b (Fig. 9). A notch 44c extending parallel to the axis of the member is cut in the top of the member to permit the impeller 43 (to be described) to pass therethrough. A rod or finger 44d projecting from the beveled end of the member 44, serves as a support for the finished portion of the secondary coil.

The secondary coil forming units A and B are identical in construction and it will therefore be necessary to describe only one of them such as unit A. The unit A is provided with a plunger 36 having a reduced end which travels in the groove 34 in the table and at the same time engages the rear end of the primary coil to feed it lengthwise along the groove toward a stop or deflector 41 and an impeller 43 to be described. The plunger 36 is reciprocated in proper timed relation with the feeding of the primary coils, by a bell crank lever 37 which is pivoted at 38 and which has one of its ends bifurcated to engage the spaced shoulders on the head of the plunger. The lever 37 at its other end is provided with a cam follower or roller 38' which engages the periphery of a cam 39 continuously driven in proper timed relation to the other movable parts of the units A and B. It will be noted that the travel of the bell crank is limited by the adjustable screw 40 which enables its unit to be adjusted to operate on primary coils of various lengths as will be referred to later.

At the right hand portion of Fig. 1 there is illustrated the impeller 43 which has the general appearance of an extremely small screw propeller and which generates the secondary coil from a primary coil. This impeller is made to such perfectly accurate dimensions that it is finished by "stoning." The exact construction of the impeller illustrated in greatly magnified form in Figs. 9, 11 to 22 inclusive, will be further described in the course of the description of the operation of the machine. The impeller is secured to a stub shaft 45, removably mounted in the end of a rotatable shaft 46 in turn suitably journalled in the bearings 47 and 47a, which are carried on a support 48 in turn supported by the micrometer screw 93 rotatably mounted in a removable platform 50. This platform is provided with a groove to receive the dovetail on a lever 51 which has one end pivoted at 52 on a removable bracket mounted on the bed plate of the unit. The mentioned dovetail and groove enables the impeller mechanism to be quickly replaced by other mechanism in order to form coils of different size or character and also to replace a unit which is in need of repair. A primary coil clamp 53 (see Figs. 9 and 10) normally forced downward by spring S (Fig. 8) is associated with the impeller to engage an intermediate portion of the primary coil periodically to retain it temporarily in a fixed position while the impeller is bending a turn of the primary coil. This clamp is formed integrally with one end of a lever 56 which is pivotally mounted at 57 on one face of the feed mechanism (see Figs. 1, 3a and 8). The other end of the lever 56 is engaged by an adjustable set screw 58 mounted in one end of a lever 59 which is pivotally mounted on a stud 60 projecting from the bearing 47. The other end of the lever 59 carries an adjustable set screw 61 which engages one end of a lever 62 which is rotatably mounted at an intermediate portion thereof on an extension 63 of the stud 60. The other end of the lever 62 engages a cam 64 secured to the impeller shaft 46. Thus as the impeller rotates, the clamp 43 will be periodically moved into clamping relation with the intermediate portion of the primary coil under the action of the spring S and then will be moved away therefrom by the cam 64 and the related levers to disengage this coil.

The various movable parts of the machine are operated by pulley 66 which is driven by any suitable source of power and which is freely rotatable on shaft 67. This pulley is engageable by the manually operable clutch element 67' secured to the shaft, so that the machine can be started and stopped at will. Pulley 66 together with the clutch element 67' when in engagement rotates the shaft 67, which in turn drives the spur gears 69 and 75, the former being mounted on shaft 67, the latter being mounted on the shaft 71. The shaft 71 through a series of removable change speed gears generally designated 72, functions to drive the impellers of both secondary coil forming units, although the driving connection for only one of these units is shown. The gears 72 drive the shaft 85 which is joined at one of its ends through a universal coupling 73 to one end of a flexible and extensible shaft the two parts 76 and 76' of which are in telescopic relation and are joined by a coiled spring 77. The other end of the flexible shaft is joined by a universal coupling 78 to the impeller shaft 46. By this arrangement the impeller can have a wide range of adjustments as will be further set forth. The shaft 71 thru the sets of spiral gears 79 and 80 and the counter shaft 81, drives the line shaft 82. This line shaft operating through the set of spiral gears 83 drives a second counter shaft 84 which rotates the cam 55 (Fig. 1) to periodically raise and lower the impeller with respect to the primary coil. The line shaft 82 also rotates a cam 86 which engages a follower on the free end of a link 33. This link functions to operate the pins of the feeding mechanism. The line shaft, thru the bevel gears 90, also drives a third counter shaft 91 on one end of which the cam 39 (Fig. 1) is mounted. By this arrangement the various parts of the units A and B function in suitable timed relation.

In the operation of the device the primary coil forming unit 5 generates the primary coils of predetermined length which are discharged through the chute 9 into the hopper 10. From the hopper the primary coils drop one at a time through the slit 11 therein, the coils alternately dropping first on the platform of the feeding mechanism of unit A and then on that of unit B. The plurality of pins 14 cooperating with each platform 12, move the series of primary coils thereon a step at a time until the primary coil at the head of the series, drops down the inclined end of the platform into the groove 34 in the table 35. At the proper time the cam 39 operating through the bell crank 37 moves the plunger 36 toward the right as shown in Fig. 1.

The reduced portion of this plunger engages the rear end of the primary coil and pushes it along the groove 34, so that its front end is forced against the deflector 41. When the primary coil has thus been pushed into place the cam 55 has been rotated to lower the lever 51. The continuously rotating impeller shaft is also in a position where the cam 64 thereon operating through the levers 62, 59 and 56 permits the clamp 53 to grip an intermediate portion of the primary coil. Immediately thereafter, the deflector 41 is lowered by the lever 51 to engage the forward end of the primary coil bending a portion of it downward, which portion serves as a terminal of the finished coil. This downward bending of the coil as shown best in Fig. 22, separates the upper side of the turns of the primary coil. The downward movement of the lever 51 also lowers the impeller so that it engages the primary coil at the upper side thereof where its turns have been separated by bending as effected by the deflector. It will be noted from Fig. 22 that the impeller is located slightly to the right of a vertical line drawn through the axis of the support 44 and is so adjusted as to engage the first turn to the right of this vertical line.

Impeller 43 rotates and in cooperation with clamp 53, bends each successive turn of the primary helix toward the right. The primary coil is also stretched slightly and as each notch in the impeller comes to, and passes the primary coil the succeeding lobe of the impeller will engage the next turn thereof. However, the impeller pitch is such that in spite of irregularities in pitch of the primary coil, one of the impeller lobes will always enter the space next to the left of the one previously engaged since this can be assured by an impeller pitch equal to the average spacing, which is such that the impeller could not enter to the left of the second turn to the left of the impeller as shown in Fig. 22. The successive bending and stretching of the primary coil by the impeller, overcomes any previously existant irregularities or "spottiness" of the primary coil, which shortens the life of lamp filaments. When the impeller 43 has moved through a portion of its cycle the clamp 53 is momentarily released by the operation of cam 64 and levers 62, 59, and 56, so that the primary helix tends to spring slightly towards the impeller. Thus it may be seen that the impeller will impart the same predetermined, bending to one turn after another of the primary coil, which bending is so predetermined that a secondary helix or coiled-coil of desired diameter is formed. After the predetermined number of turns of the primary coil have been so acted upon, cam 55 gradually raises lever 51 which functions through adjustable screw 93 to raise member 94 mounted on support 48. Member 94 elevates lever 56 against the tension of spring S when the cam completely raises lever 51. An air jet (not shown) blows the completed secondary helix off support 54 and into a receiving tray (not shown).

The precise manner in which impeller 43, support 44 and clamp 53 coact to bend the several turns of the primary coil toward the axis thereof to generate a secondary coil will be more fully understood from the Figs. 9, 10 and 22. The exact construction of the impeller is shown in Figs. 9, 11, 12 and 13. The sections P, Q, R, S, T, U, V, W are shown respectively in Figs. 14 to 21 and are radial sections of a part of the impeller, along the radii marked with corresponding letters in Fig. 13. Section P is taken radially, through the bottom of one of the notches 43A, 43B and 43C in the impeller. It should be mentioned that, while this impeller is described as having three lobes, as the portions between the notches in the impeller may be termed, it has been found desirable to utilize impellers having from one to ten lobes depending on the pitch of the primary helix and the speed of operation desired. Section Q is taken through the impeller just at that edge thereof which enters between the turns of the primary coil C', indicated in cross section within the notch 43C. The axis of the primary coil is at a very acute angle with that of shaft 46 and the axis of said primary coil is spaced from the center of shaft 46 by a distance approximately equal to, but slightly less than the maximum radius of impeller. The next section R, illustrates the portion of the impeller beyond the stoned down knife-like entering edge, and also shows the normal angle of thirty degrees between the impeller faces. The edge of the impeller is helically formed, that is, the edge lies on a helix about the axis of shaft 46. It will be noted that at section R, the edge is displaced a distance $a-b$ along shaft 46 as compared to section Q. At section S, the impeller edge is likewise displaced a distance $b-c$ further along shaft 46. As the impeller is helically cut, this edge would continue to be displaced, but by stoning the impeller during fabrication to exact tolerances, the edge is held at the same point axially along shaft 46, as indicated by the fact that the distance $b-c$ remains constant in section T, U, V and W. This results in a progressive reduction of the radial distance from the center of the impeller to its edge, from the point where section S cuts the impeller edge to the notch 43B.

The bending of a turn of the primary coil toward its axis, is accomplished while the impeller rotates so that the portion thereof engaging the primary coil advances from the notch 45C to the point on the impeller lobe shown in section S. The primary coil has two of its adjacent turns thus pried apart, and is also stretched, since clamp 53 engages the primary coil at this time.

When the portion of the impeller lobe between T and U is passing through the primary coil, cam 64 causes clamp 53 to release this coil. The aforementioned stretching of the primary coil causes that portion thereof to the left of the impeller in Fig. 22, to move toward the impeller, since the clamp is now released but the portion of the coil at the right of the impeller is prevented from moving back as the impeller is in contact therewith.

This stretching of the primary helix will be apparent from Fig. 22 in which the greater spacing of primary helix turns in the region between clamp 53 and impeller 45, is clearly shown. Now, referring to Fig. 18, section T of the impeller lobe shows the condition just before release of clamp 53, the side of the primary coil turn on the right side of the impeller being spaced therefrom, while that turn of the primary coil, to the left of the impeller is in contact therewith. When clamp 53 is released the stretching of the coil between the clamp and the impeller 45 is relieved and all that portion of the primary coil to the right of the impeller moves to the left, and the turn of the primary coil to the right of the impeller comes in contact therewith as may be seen in section V. This alternate stretching and release of the primary coil, and the shaping of the impeller blade feeds the primary coil lengthwise so that the lobes of the impeller 45 engage and bend the succeeding turns of the primary coil in succession. The progress of the primary coil, into the impeller, may thus be characterized as a crawling motion.

Cam 64 causes clamp 53 to reengage the primary coil C' when the sections T, U of a given impeller lobe passes out of the primary coil. Shortly thereafter, the impeller disengages the primary coil which now will lie in the impeller notch 43B, the notch 43B having rotated to the position of 43C as shown in Fig. 13. The portion of the impeller between notches 43B and 43A is precisely similar to that between notches 43C and 43B. The entering edge of the impeller enters the primary coil between the next two turns thereof and then forces them apart thereby continuing to bend and stretch the helix, in the manner just described. The subsequent release of clamp 53, allows another lengthwise motion of the coil, as described previously. After the notch 43A passes the primary coil, the entering edge of the impeller lobe between notches 43A and 43C formed in the same manner as the other lobes, engages the next turn of the primary helix, and the bending and lengthwise motions of the primary coil are repeated.

It will be apparent that by successively prying apart the turns of the primary coil, and by arranging the angle suitably between the impeller shaft and the axis of the primary coil, the said primary coil will be progressively bent so as to form a secondary coil C2 as illustrated in Figs. 23, 24 and 25. It will be apparent that the impeller must correspond in pitch, to the pitch of the primary coil on which it operates.

It is to be noted that cam 55 makes one complete revolution during the forming of the coiled-coil filament. Of course the support 44 and impeller 43 are adapted to a particular type of coil only, and are made interchangeable with other similar units adapted to handle other types of coils.

It should be emphasized that the impeller 43 and support 44 and the clamp 53 are of necessity very minute. For example, the sum of the distances ab and bc in Figs. 14 to 21, is but three one thousandths of an inch. Furthermore, the accuracy with which the positions of support 44 and impeller 43, and clamp 53 must be adjusted, exceeds any possible tolerances in tool making. In addition these distances and adjustments are not the same for various types of coiled-coil filaments which the machine should produce. It is therefore essential to the successful construction and operation of this machine that exceedingly accurate operating adjustments be provided whereby all parts may be brought exactly into the proper relationship for production of coiled-coils of a predetermined type.

Since the pitch or spacing of the turns of the secondary coil is determined by the acuteness of the angle in a horizontal plane between the axis of the shaft 46 and the axis of the coil guide 34, suitable fine, accurate adjustments must be provided for varying this angle so that very closely wound secondary coils may be made, thereby permitting the use of relatively small necked bulbs even with filaments of considerable wattage. This adjustment is effected by the micrometer adjusting screws 49 since the support 48 which carries the impeller shaft 46 rotates about the axis of the screw 93.

In order to insure that the impeller 43 will always engage the center of the top of the primary coil C', the impeller shaft must be bodily adjustable in a horizontal direction. This is effected by the micrometer screw 95 which shifts the platform 50 transversely of the lever 51 being accurately guided by the groove and dovetail in these parts.

It has been mentioned that the impeller 43 is adjusted to engage the first primary coil turn to the right of the vertical line through support 44 (Fig. 22). This adjustment is brought about by shifting the impeller shaft 46 lengthwise, being effected by the micrometer screw 96. The righthand end of the screw 96 (Fig. 1) carries a yoke 97 to one end of which a swinging yoke 98 is pivoted. The free ends of these yokes engage the respective surfaces of a shoulder 99 provided on the impeller shaft 46. A screw 100 threaded into these yokes permits relative adjustment therebetween so that the amount of play between the ends of the yokes and the shoulder 99 can be closely controlled.

In order that the depth, which the impeller dips into the primary helix, may be accurately controlled, the support 48 is movable vertically by means of the micrometer screw 93 and the adjusting nut 101, carried thereby. Screw 93 also adjusts the position of the impeller, by raising or lowering support 48, for primary helices of various sizes, and also determines the diameter of the secondary helix. In adjusting support 48 vertically by means of the micrometer adjusting screw 93, the screws 49 are of course backed away from engagement with support 48. After support 48 has been properly adjusted, screws 49 are again turned into clamping relation with support 48.

What I claim is:

1. The method of winding a primary helix wire into a secondary helix which comprises moving the primary helix through a predetermined path and in individually separating adjacent turns of the primary helix to produce a secondary helix.

2. The method of winding a primary helix wire into a secondary helix which comprises moving the primary helix through a predetermined path, and in applying a force against the turns thereof to form said primary coil into a secondary coil.

3. The method of making coiled-coil filaments which comprises supporting a helically coiled filament and in moving a member between the turns thereof to separate them and cause the coiled filament to form a secondary helix.

4. The method of forming a wire helix into a secondary helix which comprises moving the filament through a given path and intermittently applying a force between the turns of the first named helix to cause them to separate and form a second helix.

5. The method of winding a primary helically wound wire into a secondary helical coil which comprises causing a separator element to move between the turns of the primary coil.

6. The method of winding a primary helically wound wire into a secondary helical coil which comprises causing a separator element to move through a path substantially transverse to the longitudinal axis of the primary coil and successively pass between the turns thereof.

7. The method of winding a primary helically wound wire into a secondary helical coil which comprises causing a separator element to successively pass between the turns of the primary coil and in intermittently interrupting the operation of the separator element.

8. The method of winding a primary helically wound wire into a secondary helical coil which comprises causing a separator element to move through a path substantially transverse to the longitudinal axis of the primary coil and pass between the turns thereof and in intermittently terminating the operation of said element.

9. The method of winding a wire into a primary helix and a secondary helix which comprises winding a wire into a helix, causing said helix to move through a given path and in applying a force against the turns of the helix successively to cause the helix to take the form of a second helix.

10. The method of making a coiled-coil filament which comprises moving a filament wire into a die to produce a helically wound wire and in individually separating the turns along one side of the helix to cause the helix to take the shape of another helix.

11. A lamp filament composed of a filamentary wire free from tensional stress coiled to helical form by a pushing operation and again coiled to form a secondary helix by an individual separation of the turns of the first helix in the absence of tensional stress.

12. A filament for an incandescent electric lamp comprising a wire coiled to helical form by a pushing operation to avoid tensional stress in the wire and again coiled into a secondary helix by an individual separation of the turns of the first helix to maintain the absence of tensional stress.

13. The method of winding a primary helically wound wire into a secondary coil of any desired diameter which comprises causing a separator element to move between the turns of the primary coil and varying the diameter of the resulting secondary coil by varying the distance or depth that said element extends into the turns of the primary coil.

14. The method of winding a primary helically wound wire into a secondary coil of any desired pitch which comprises causing a separator element to move between the turns of the primary coil, and varying the angle at which said element moves between the turns of the primary coil to vary the pitch of the resulting secondary coil.

15. The method of feeding a primary helically wound wire and winding it into a secondary helical coil which comprises the step of holding a portion of the primary coil temporarily while causing a separator element to pry apart a pair of adjacent turns of the primary coil and to stretch the part of the primary coil between said held portion and the turns that are being pried apart and the step of releasing said first-mentioned portion of said primary coil while said element is still in engagement with said turns whereby said stretched part of the primary coil advances toward said element and repeating said steps for succeeding turns of a substantial part of said primary coil.

16. The method of winding a primary helically wound coil of wire into a secondary coil which comprises feeding said coil lengthwise, distorting a portion of said primary coil to separate its turns, and passing a separator element through the space between successive separated turns to bend them permanently toward the axis of said primary coil.

17. The method of winding an intermediate portion of a length of primary coil into a secondary coil having straight end portions of any predetermined length which method comprises successively bending toward the axis of the primary coil, the turns of the intermediate portion of the primary coil, said intermediate portion being spaced from the ends of the primary coil a distance equal to the desired length of said end portion.

18. In an apparatus for making a coiled coil, means for generating a primary helically wound coil, mechanism for generating a secondary coil from said primary coil, said mechanism including means for bending certain of the turns of the primary coil toward the principal axis thereof, and means for receiving the primary coil from said first mentioned means and delivering same to said mechanism.

19. The method of winding a primary helically wound wire into a secondary coil of any desired pitch which comprises causing a separator element to move between the turns of the primary coil, and adjusting the relation of the primary coil and the separator element to vary the pitch of the resulting secondary coil.

20. A machine of the class described comprising means for supporting a primary coil, means movable between the turns of said coil, means for causing a relative movement between said coil and said means, and means for operating said second mentioned means to engage the turns of said primary coil to produce a secondary coil.

21. A machine of the class described comprising means for winding a wire into a primary helical coil, means for guiding said primary coil through a predetermined path, means movable between the turns of said coil, and means for operating said movable means to space adjacent turns of the coil upon a movement of said primary coil a distance equal to the distance between the centers of adjacent turns and a guide finger to receive the primary coil after the spacing operation.

22. A machine of the class described comprising means for supporting a primary helical coil, means for moving a member between the turns of said coil and means for causing a relative movement between said respective means to cause said last named means to successively separate the turns of said primary coil to form a secondary coil.

23. A machine of the class described comprising means for supporting a primary helical coil, means for moving a member between the turns of said coil, means for causing a relative movement between said respective means to cause said last named means to successively separate the turns of said primary coil to form a secondary coil, and means for supporting the turns of said secondary coil.

24. A machine of the class described comprising means for supporting a primary helical coil, means for moving a member between the turns of said coil, means for causing a relative movement between said respective means to cause said last named means to successively separate the turns of said primary coil to form a secondary coil, and a finger cooperating with said second mentioned means to receive said secondary coil.

25. A machine of the class described comprising means for moving a primary helical coil through a given path and a member movable transverse to the longitudinal axis of and between the successive turns of said coil for spreading the turns thereof to produce a secondary coil.

26. A machine of the class described comprising means for moving the primary helical coil through a given path, coil turn separating means and means for moving said second mentioned means transverse to the longitudinal axis of and between the successive turns of said coil to separate said turns and produce a secondary coil.

27. A machine of the class described comprising means for winding a wire into a primary helical coil, means for guiding said primary coil through a predetermined path, coil turn separator means movable between successive turns of said coil and means for moving said separator means into operative relation with said coil to space adjacent turns thereof upon a movement of said coil a given distance along said path.

28. A machine of the class described comprising means for winding a wire into a primary helical coil, means for guiding said primary coil through a predetermined path, coil turn separator means movable across said path between successive turns of said coil, and means for moving said separator means to space adjacent turns of the coil upon a movement of said primary coil a distance equal to the distance between the centers of the adjacent turns of said coil.

29. A machine of the class described comprising a coil winding die, means for moving a wire into said die to form a primary coil and means movable transverse to the longitudinal axis of and between the successive turns of said coil for separating the turns thereof to produce a secondary coil.

30. A machine of the class described comprising a coil winding die, means for moving a wire into said die to form a primary helical coil and means movable transverse to the longitudinal axis of and between the successive turns of the coil for individually separating the turns of the primary coil to produce a secondary coil.

31. A machine of the class described comprising a coil winding die, means for moving a wire into said die to form a primary helical coil, means movable transverse to the longitudinal axis of and between the successive turns of said coil, said second mentioned means operating in timed relation with said first named means for individually separating the turns of said primary coil to produce a secondary coil and means for supporting said secondary coil.

32. A machine for winding a primary helical wire into an air core secondary helix comprising means for exerting a force in the space between successive turns of the primary helix to separate the turns thereof to produce a secondary coil and means for actuating said means.

33. A machine of the class described comprising means for supporting a primary helical coil, coil turn separator means movable between successive turns of said coil, means for moving said primary coil, and means for moving said separator means into operative relation with said coil to space adjacent turns thereof upon a movement of said coil a given distance.

34. A machine of the class described comprising means for supporting a primary helical coil, coil turn separator means movable between successive turns of said coil, means for moving said primary coil in the direction of its longitudinal axis, and means for moving said separator means to space adjacent turns of said coil upon a movement of said coil a distance equal to the distance between the centers of the adjacent turns of said coil.

35. A machine of the class described comprising means for supporting a primary helical coil, and means movable transverse to the longitudinal axis of and between the successive turns of said coil for separating the turns thereof to produce a secondary coil.

36. A machine of the class described comprising means for supporting a primary helical coil, and a blade movable transverse to the longitudinal axis of and between the successive turns of the coil for individually separating the turns of the primary coil to produce a secondary coil.

37. A machine of the class described comprising means for causing an endwise movement of a primary helical coil, means movable transverse to the longitudinal axis of and between the successive turns of said coil, said second mentioned means operating in timed relation with said first named means for individually separating the turns of said primary coil to produce a secondary coil, and means for supporting said secondary coil.

38. A machine of the class described comprising means for supporting a primary helical coil, means for exerting a force in the space between successive turns of said primary coil to separate the turns thereof to produce a secondary coil.

39. A machine of the class described comprising means for supporting a primary helical coil, means for exerting a force in the space between successive turns of said primary coil to separate said turns a predetermined distance to produce a secondary coil of a given pitch, and means for varying the degree of said force to separate said turns a different distance to produce a secondary coil of a different pitch.

40. A machine of the class described comprising means for supporting a primary helical coil, a coil turn separator member, means for moving said member successively between the turns of said coil to space said turns and produce a secondary coil of a given pitch, and means for varying the depth of movement of said member to produce a secondary coil of a different pitch.

41. A machine of the class described comprising means for supporting a primary helical coil, a blade, means for moving said blade successively between the turns of said coil to space said turns and produce a secondary coil of a given pitch, and means for changing the degree of movement of said blade toward said coil to change the degree of spacing of said turns to vary the pitch of said secondary coil.

42. A machine of the class described comprising a means for supporting a primary helical coil, a member movable transverse to the longitudinal axis of said coil for spreading the turns thereof a given distance to produce a secondary helical coil of a given pitch, and means for changing the relative positions of said member and said primary coil to spread the turns of the primary coil a different distance to produce a secondary coil of a different pitch.

43. A machine of the class described comprising means for supporting a primary coil, a blade, means for actuating said blade, means for causing a timed relative movement between said blade and said coil to cause the blade to pass between successive turns of the coil to separate the turns and produce a secondary coil, and means for changing the relative positions of said coil and blade to vary the depth of movement of said blade between said turns to vary the pitch of said secondary coil.

44. A machine of the class described comprising means for supporting a primary coil, a blade, means for actuating said blade, means for causing a timed relative movement between said blade and said coil to cause the blade to pass between successive turns of the coil to separate the turns and produce a secondary coil, and means for varying the depth of movement of said blade as it passes between said turns to vary the pitch of the secondary coil.

45. A machine of the class described comprising means for supporting a primary helical coil, a rotatable blade, and means for moving said blade through an arcuate path successively between the turns of said coil to space the turns and produce a secondary coil.

46. A machine of the class described comprising means for supporting a primary helical coil, a rotatable blade, means for moving said blade through an arcuate path successively between the turns of said coil to space the turns and produce a secondary coil, and means for supporting the newly formed turns of said secondary coil.

47. A machine of the class described comprising means for supporting a primary helical coil, a member having a knife edge, and means for moving said member through an arcuate path successively between the turns of said coil to space the turns and produce a secondary coil.

48. A machine of the class described comprising means for supporting a primary helical coil, means movable between the successive turns of said coil for separating the turns thereof to produce a secondary coil, and a supporting mandrel to receive the newly formed turns of the secondary coil.

49. A machine for winding a primary helical section into a secondary helically-coiled section comprising, a rotary member for separating the turns of said primary coil to form a secondary coil, means for moving said member into operative relation with said primary coil, means for operating said member to produce a secondary coil with a predetermined number of turns, and means for moving said member from operative relation with said primary coil.

50. A machine for winding a primary helically coiled section into a secondary helical coil having straight terminals comprising an arbor having a slot, a secondary coil-forming member movable in said slot, means for supporting a primary coil across said slot with a portion at one end of said section extending beyond said slot, means for operating said coil-forming means to cause a secondary coil to issue from said slot continuous with said extending portion, and means for terminating the coil-winding operation a given distance from the other end of said primary coil to leave a portion of the primary coil at the other end of said section, said portions constituting straight terminals at opposite ends of said secondary coil.

51. A machine of the class described comprising means for supporting a primary helical coil, separator means movable transverse to the longitudinal axis of and between the successive turns of said coil for separating the turns thereof to produce a secondary coil, holding means to secure said primary coil against endwise movement as said separator means moves between the turns, and means for releasing said holding means.

52. A machine of the class described comprising means for supporting a primary helical coil, separator means movable transverse to the longitudinal axis of and between the successive turns of said coil for separating the turns thereof to produce a secondary coil, holding means to secure said primary coil against endwise movement as said separator means moves between the turns, and means for momentarily releasing said holding means during movement of said separator means between said turns.

53. The method of winding a primary helically coiled section into a secondary coil comprising individually separating adjacent turns of the primary helix, beginning a predetermined distance from one end of said section, to produce a secondary helix, and continuing said operation until a predetermined number of secondary turns have been formed short of the other end of said section, so as to leave terminal portions having straight axes.

54. A machine for winding a primary helically-coiled section into a secondary helically-coiled section comprising means for supporting said primary coil, secondary coil forming means, means for moving said coil-forming means into operative relation with said primary coil to form a secondary coil, and means operating after the formation of a predetermined number of turns to remove said secondary coil-forming means.

55. A machine for winding a primary coiled section into a secondary coiled section having straight terminals comprising, means for starting a secondary coil-winding operation in one predetermined direction a given distance from one end of said primary coil, and means for terminating said coil-winding operation a given distance from the other end of said primary coil.

56. A machine for winding a primary coiled section into a secondary coiled section having straight terminals comprising, means for starting a secondary coil-winding operation in one predetermined direction a given distance from one end of said primary coil, means for terminating said coil-winding operation a given distance from the other end of said primary coil, and means for automatically discharging said secondary coil from said machine.

57. The method of making a coiled-coil filament from a primary helical coil which comprises progressively moving said primary coil to a given position, a turn at a time, and bending at said position each turn in succession of said primary coil a given amount toward the principal axis of said coil, the progressive movement of said primary coil being effected by intermittently engaging said primary coil at a given locus in advance of said position as each turn is being bent away from said position whereby a portion of said coil is placed under tension, and disengaging said primary coil at said locus while preventing retrograde movement of the primary coil at said position.

58. In a device of the class described, a primary coil support, means for intermittently holding said coil with respect to said support, means for bendng each turn of the primary coil in succession toward the principal axis of said coil, said bending means also serving to place under tension a section of said coil located between said respective means, mechanism for disengaging said holding means from said coil after each turn is bent whereby said primary coil is fed progressively by the interaction of said holding means and said bending means.

59. The method of winding a primary helix wire into a secondary helix which comprises moving the primary helix endwise through a predetermined path, bending a portion of the primary coil away from its long axis, and applying a force between the turns of said bent portion to change the space relation of portions of adjacent turns thereof to form said primary coil into a secondary coil.

60. The method of correcting the pitch variations of the turns of a primary helically wound coil of wire which comprises stretching successive portions of said primary coil while permanently bending each turn of the coil in succession a uniform amount from a given side of the coil toward the axis thereof.

61. The method of setting the pitch of a primary coil and forming it into a secondary coil or coiled-coil which comprises stretching successive portions of said primary coil lengthwise, and permanently and uniformly increasing in succession the spacing between adjacent coil turns at a given side of said coil by an amount greater that the spacing between the turns at the opposite side of said coil.

62. A method of setting the pitch of a primary coil and forming it into a secondary coil or coiled-coil which comprises repeatedly stretching and relieving successive portions of said primary coil and permanently bending each turn of the primary coil in succession a uniform amount from one side of said coil toward the principal axis thereof.

63. In an apparatus for generating a secondary coil from a primary coil, a support, means for moving a primary coil lengthwise along said support in a given path, means for deflecting a portion of said coal away from said given path whereby the spaces between adjacent coil turns are opened up, and mechanism including separating means entering said spaces for permanently bending each coil turn in succession from a given side of said coil toward the principal axis thereof.

64. In an apparatus for generating a secondary coil from a primary coil, a support provided with a channel along which a primary coil may be moved lengthwise, a member provided with a transversely extending inwardly curved guide, said member being mounted on said support with said guide communicating with said channel, said member being provided with a finger extending generally in a direction at right angles to said guide, said member having an inclined surface intersecting said guide and facing generally in the direction of said finger, and means movable transversely with respect to said guide for bending each turn of said primary coil in succession toward said guide.

SAMUEL KARASICK.